June 10, 1958 R. A. CRAMER, JR 2,838,124
POWER MOWER DRIVE MECHANISM
Filed Aug. 13, 1956 3 Sheets-Sheet 1

INVENTOR.
Roy A. Cramer Jr.
BY
Fishburn & Gold
ATTORNEYS.

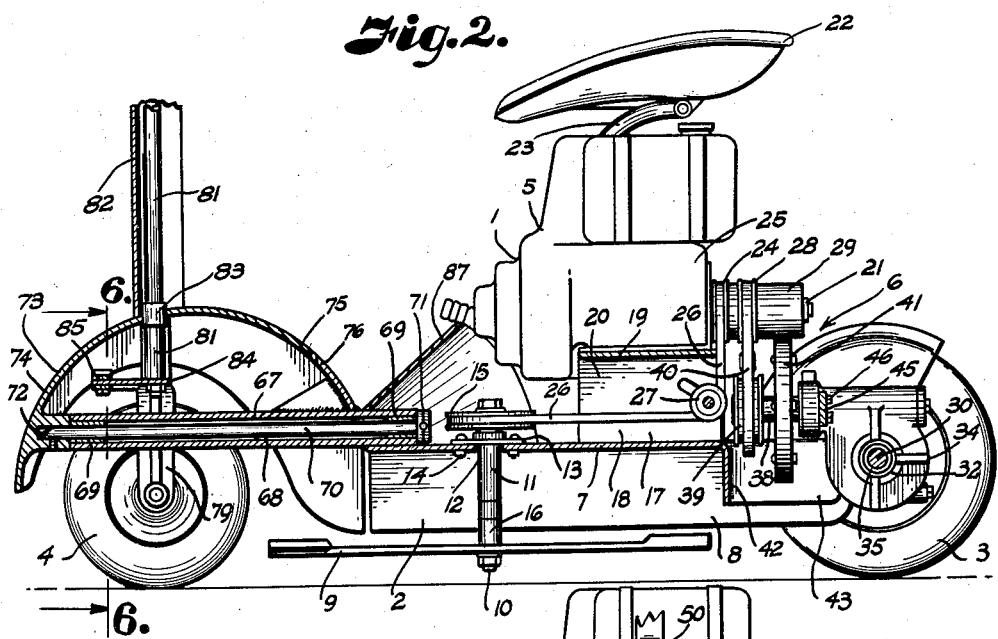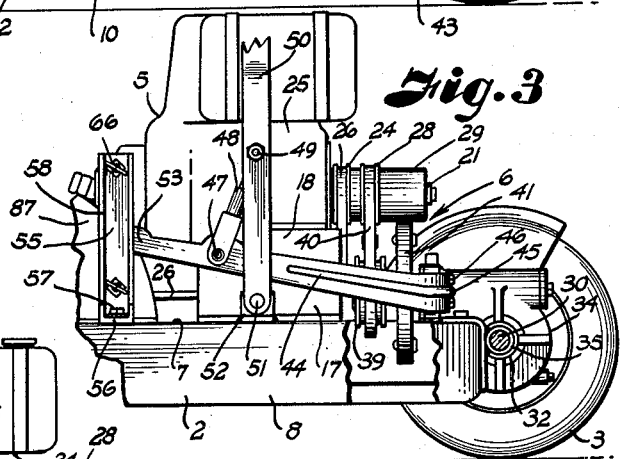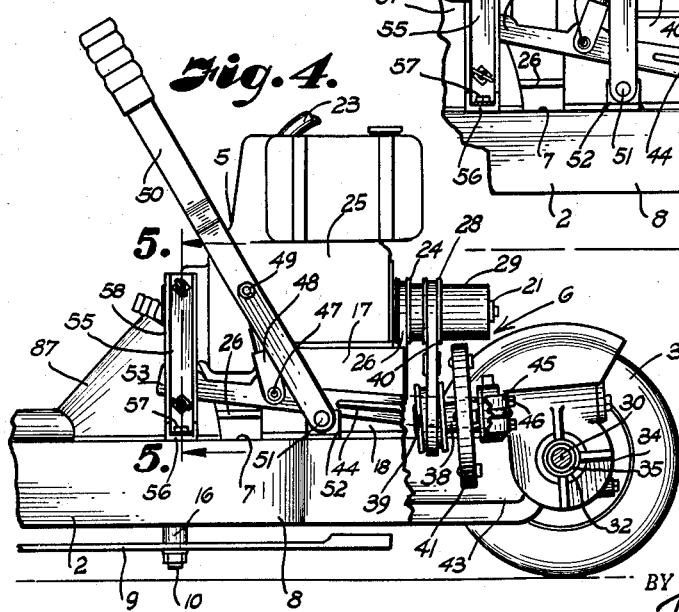

June 10, 1958  R. A. CRAMER, JR  2,838,124
POWER MOWER DRIVE MECHANISM
Filed Aug. 13, 1956  3 Sheets-Sheet 3

INVENTOR.
Roy A. Cramer Jr.
BY
Fishburn Gold
ATTORNEYS.

United States Patent Office 2,838,124
Patented June 10, 1958

2,838,124
POWER MOWER DRIVE MECHANISM

Roy A. Cramer, Jr., Kansas City, Mo.

Application August 13, 1956, Serial No. 603,528

4 Claims. (Cl. 180—70)

This invention relates to mowing machines, and more particularly to a power driven lawn mower and the like and the drive mechanism therefor.

The principal objects of the present invention are to provide a power driven vehicle such as a lawn mower which incorporates a unique mounting of the traction unit and a novel drive connection from the power unit to the traction unit; to provide a power driven lawn mower with spaced traction wheels on driven shafts extending from a differential housing which is supported on the mower frame or housing for rocking movement on the axis of said driven shafts for engaging and disengaging a drive connection from the power unit to the traction wheels; to provide a mechanism that will quickly and easily rock the differential housing to move the drive mechanism into forward, neutral or reverse position; to provide such a lawn mower with the traction wheels at one end and steering wheels at the other end whereby the steering wheel support is articulated for movement over uneven terrain; to provide such a lawn mower that is of the riding type with the power unit between the traction and steering wheels and substantially under the operator for stability and increased traction; to provide such a drive mechanism with a torque arm fixed to the differential housing and operatively connected to a control lever for rocking said differential to selected drive positions; to provide a yieldable friction clamp structure engaging the torque arm to aid in retaining same in selected position and dampen vibration or movement of the torque arm and differential housing when in driving position; and to provide a power lawn mower drive that is economical to manufacture, of sturdy character and not readily damaged by dust, dirt, oil or water, and that is safe and foolproof in operation.

In accomplishing these and other objects of the present invention, I have provided improved details of structure, the preferred form of which is illustrated in the accompanying drawings, wherein:

Fig. 2 is a longitudinal sectional view through the lawn mower.

Fig. 3 is a side elevation of the lawn mower with portions broken away to show the position of the control mechanism for reverse drive.

Fig. 4 is a side elevation of a portion of the lawn mower with portions broken away to illustrate the position of the control and drive mechanism in forward drive position.

Figure 1:
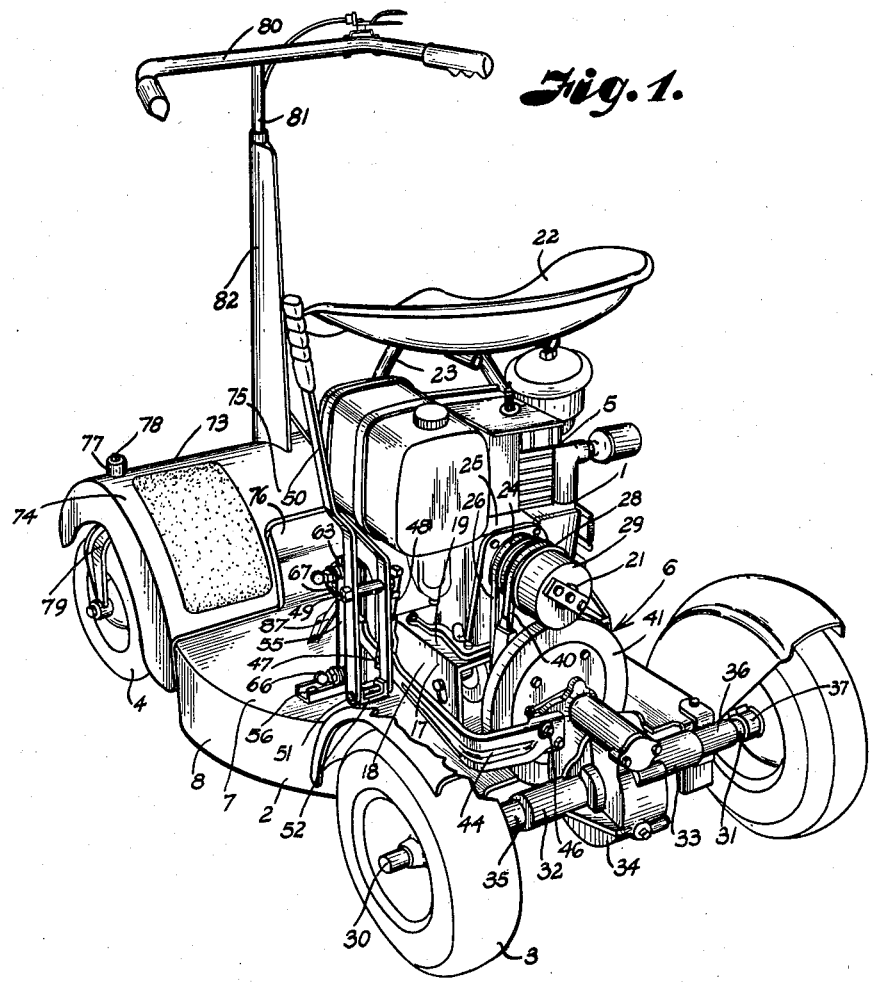
Fig. 1 is a perspective view of a power driven lawn mower embodying the features of the present invention.
Figure 5:
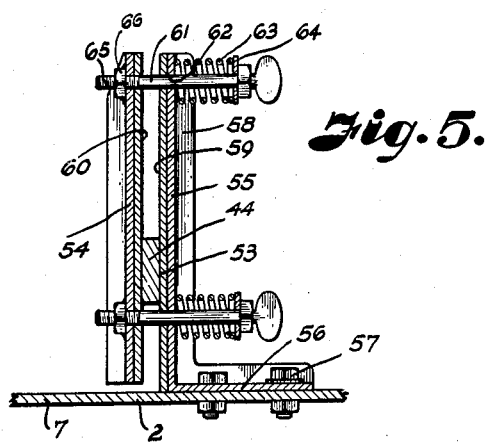
Fig. 5 is a transverse sectional view through the frictional clamp for the torque arm taken on the line 5—5, Fig. 4.
Figure 6:
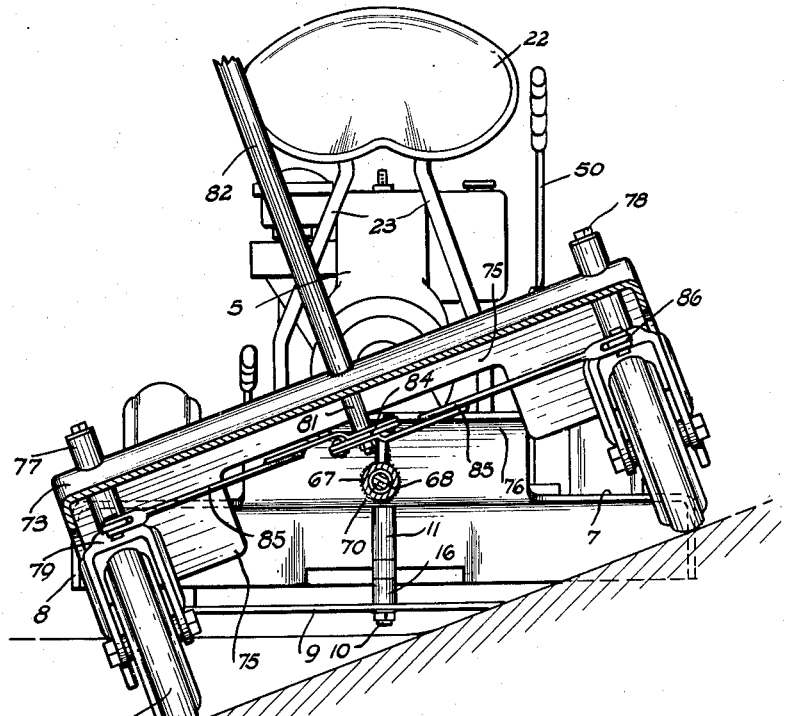
Fig. 6 is a transverse sectional view through the steering wheel supporting mechanism taken on the line 6—6, Fig. 2.
Figure 7:
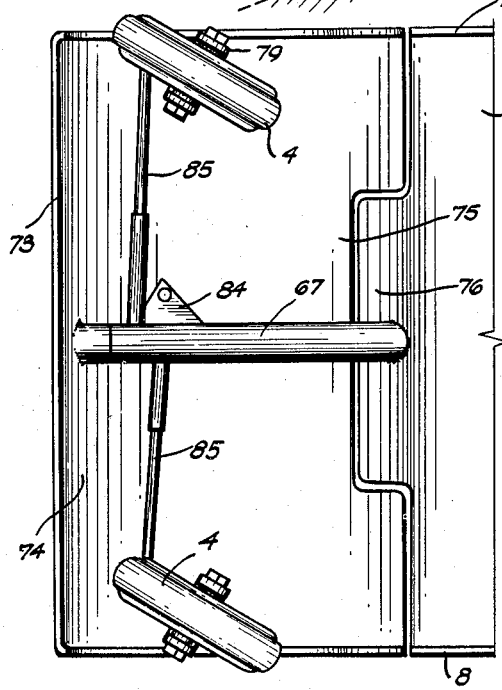
Fig. 7 is a bottom view of the steering wheel mechanism.

Referring more in detail to the drawings:

1 designates a power driven vehicle illustrated in the form of a power driven lawn mower having a frame or housing 2 supported by traction wheels 3 and steering wheels 4 arranged at the opposite end portions thereof and a power unit such as an engine 5 supported on the frame or housing 2 intermediate the ends thereof with driving mechanism 6 operatively connecting the power unit with the traction wheels for propelling the vehicle or lawn mower.

The housing or frame 2 has a top wall 7 with depending side walls 8 of suitable spacing and contour to provide side enclosures for a cutting blade 9 fixed to a shaft 10 rotatably mounted in a bearing 11 which extends through an aperture 12 in the top wall 7 and is provided with a flange 13 suitably secured by fastening devices 14 to said top wall. The bearing member 11 supports the shaft 10 for rotation about a substantially vertical axis whereby the cutting blade 9 is rotated substantially in a horizontal plane to mow grass and the like. The shaft 10 extends upwardly from the bearing member 11 and has a pulley 15 fixed thereto above the top wall 7. Suitable spacers 16 are arranged on the shaft 10 whereby the height of the cut may be adjusted by arranging said spacers above or below the cutting blade 9. An engine support 17 is arranged on the top wall 7 and has spaced side walls 18 suitably secured thereto, the upper ends of said spaced side walls being connected by a transverse plate 19 to cooperate with said side walls and the top wall 7 to define a longitudinal tunnel 20 open at the ends thereof. The engine 5 is suitably secured to the support 17 whereby it is positioned on the housing or frame 2 and spaced from the shaft 10 toward the traction wheels 3 with the power shaft 21 of said engine substantially horizontal and longitudinally of the frame or housing 2.

A seat 22 is supported substantially over the engine 5 on standards 23 extending upwardly from the housing or frame 2 adjacent the sides of the support 17. A pulley 24 is fixed on the power shaft 21 adjacent the crankcase 25 of the engine and said pulley operatively connected to the pulley 15 by a flexible drive member such as a belt 26, suitable idler pulleys 27 being mounted on the support 17 to change the direction of the belt whereby it extends through the tunnel 20 formed by the support. A pulley 28 is fixed to the power shaft 21 in spaced relation to the pulley 24 and a friction pulley 29 is fixed to said power shaft 21 between the pulley 28 and the end of the shaft.

The traction wheels 3 are fixed on differential driven shafts 30 and 31 rotatably mounted in bearing extensions 32 and 33 extending oppositely from a differential housing 34 which contains the usual differential mechanism (not shown). The shafts 30 and 31 between the traction wheels and the ends of the bearing portions 32 and 33 are rotatably mounted in bearings 35 and 36 respectively fixed on the housing or frame 2 adjacent the end toward the traction wheels whereby the axis of the shafts or axles 30 and 31 extend transversely of the mower and the differential housing 34 is rotatable about said axis. Suitable collars 37 are secured to the shafts 30 and 31 adjacent the bearings 35 and 36 to limit sidewise movement of the differential housing. In the illustrated structure, the differential housing 34 is of the type employing a worm gear drive and the differential drive shaft 38 extends toward the engine 5 in spaced relation to the power shaft 21. A pulley 39 is fixed on the differential drive shaft 38 in closely associated but normally spaced relation to the pulley 28 on the power shaft 21 with a drive belt 40 operatively connecting said pulleys 28 and 39. A friction plate or disc 41 is fixed to the differential drive shaft 38 and is of greater circumference than the pulley 39, said friction disc or plate being a reverse wheel formed of pressed reinforced asbestos or the like and of such size relative to the normal spacing between the shafts 21 and 38 that when the periphery of the reverse friction disc 41 engages the periphery of the friction drum 29, the belt 40 is loosened relative to the pulleys 28 and 39 whereby the pulley 28 can turn without rotating the belt 40 thereby providing a reverse drive to the traction wheels 3. When the differential housing is rotated to move the shaft 38 downwardly relative to the power shaft 21 sufficiently to disengage the reverse wheel 41 from the friction drum 29 but insufficient to apply tension to the belt 40, a neutral position is obtained. Further rocking movement of the differential housing to move the shaft 38 downwardly tightens the belt 40 whereby the tension thereon effects a driving engagement of the belt with the pulleys 28 and 39 to effect a forward drive of the traction wheels 3. In the illustrated structure, the rear portion of the top wall 7 of the housing or frame 2 is removed to provide clearance for the pulley 28 and reverse wheel 41 and said housing provided with a rear depending wall 42 extending transversely of the housing forwardly of the pulley 39 but rearwardly of the circle defined by the outer ends of the cutter blade 9, said transverse wall 42 terminating at its ends in rearwardly extending walls 43 that extend to the rear or end of the frame or housing adjacent the traction wheels 3.

A torque arm 44 has an end portion 45 secured by suitable fastening devices 46 to the differential housing 34 whereby said arm extends therefrom alongside of the engine support 17, said arm intermediate its ends being pivotally connected as at 47 to one end of an adjustable link 48 the other end of which is pivotally connected as at 49 to a shift lever 50 that is pivotally mounted as at 51 on a bracket 52 fixed on the frame or housing at one side of the torque arm 44 rearwardly of the pivotal connection 47 whereby swinging movement of the shift lever 50 toward the traction wheels raises the arm 44 to rock the differential housing and move the shaft 38 thereof upwardly to effect engagement of the periphery of the reverse wheel 41 with the friction drum 29. Forward swinging movement of the shift lever 50 swings the torque arm 44 downwardly to disengage the reverse drive and tighten the belt 40 to effect a forward drive of the traction wheels 3.

The forward or end of the torque arm 44 remote from the traction wheels extends from the pivotal connection 47 and is provided with opposed flat sides 53 which extend between friction plates 54 and 55 of a vibration dampening mechanism. In the illustrated structure, the friction plate 55 is L-shaped whereby a leg 56 rests on the top wall 7 of the housing or frame and is secured thereto by suitable fastening devices 57 and the other leg 58 extends upwardly alongside of the torque arm 44 and has a friction facing 59 normally engaged with adjacent flat surface of the torque arm. The plate 54 has a friction surface 60 thereon adapted to engage the other flat surface of the torque arm and said plate is supported on spaced rods 61 which extend through apertures 62 in the plate 55. Springs 63 are sleeved on the rods 61 with one end engaged with the plate 55 and the other end engaged with suitable abutments such as washers or the like 64 on said rods whereby said springs urge the friction surfaces 59 and 60 against the flat surfaces 53 of the torque arm. It is preferable that the rods 61 have threaded portions 65 screwed into nuts 66 or the like for adjusting the pressure applied by the springs 63. The frictional engagement of the plates with the torque arm tends to hold same in selected position, and particularly tends to dampen vibrations or other movement of the torque arm 44 which may result from variations in the driving engagement of the traction wheel with the terrain over which the vehicle is operated. The rods 61 having a vertical spacing greater than the normal swinging limits of the torque arm 44 also provides a structure wherein the pressure at one end of the arcuate movement of the torque arm may be greater than at the other end to provide desired resistance at particular driving positions of the torque arm.

The mounting of the steering wheels 4 preferably is articulated relative to the housing or frame 2. In the illustrated structure, an extension 67 is fixed to the housing or frame 2 and extends therefrom as illustrated in Fig. 2, said extension being provided with a bore 68 arranged longitudinally of the frame 2 and having bearings 69 therein rotatably mounting a shaft 70. One end of the shaft 70 has a collar 71 fixed thereto and the other end of the shaft is suitably fixed in a bore 72 of a steering wheel housing 73 having an arcuate wall 74 that extends transversely of the frame 2, said arcuate wall 74 providing clearance thereunder for the steering wheels 4 and having a rear portion 75 that is closely positioned to an upward and forwardly curved extension 76 of the top wall 7 of the housing or frame 2. The arcuate wall 74 has bearing portions 77 adjacent the ends thereof to rotatably mount spindle shafts 78 that extend upwardly from wheel mounts 79 that preferably have bifurcated portions that straddle the steering wheels 4 that are rotatably supported thereon whereby turning of the wheel mounts 79 will turn the wheels 4 to steer the vehicle. The steering of the vehicle is effected by suitable steering arms 80 fixed on a steering shaft 81 enclosed in a post 82 fixed on and extending upwardly from the arcuate wall 74, said shaft extending through a bearing member 83 on the arcuate wall 74 and having an arm 84 fixed on the lower end of the steering shaft 81. The arm 84 is pivotally connected to adjacent ends of links 85 the other ends of which are pivotally connected to arms 86 fixed on the wheel mounts 79 whereby turning of the steering arms 80 will turn the wheel mounts 79 in the bearings 77 to steer the vehicle.

The housing extension 76 preferably forms a foot rest for an operator and a guard wall 87 extends therefrom toward the engine to provide a housing over the pulley 15.

When using a device constructed and assembled as described, the drive mechanism 6 is moved into neutral position by movement of the shift lever 50 which is in operative connection with the torque arm 44 to control the rocking movement of the differential housing 34. When the drive is in neutral position, the engine 5 may be readily cranked. After the engine is started, the power shaft 21 constantly turns and through the connection of the belt 26 rotates the cutter blade 9. In order to effect forward movement, the shift lever 50 is moved to swing to torque arm 44 downwardly to tighten the belt 40 into driving engagement with the pulleys 28 and 39 whereby the rotative motion of the power shaft 21 is transmitted to the differential drive shaft 38 which through the differential mechanism rotates the differential driven shafts 30 and 31 to rotate the traction wheels 3. As the machine moves forwardly, it is steered by turning the steering arms 80 to turn the steering wheel mounts 79. If the machine is moving over an uneven terrain, the axis of the traction wheel shaft being fixed relative to the housing or frame 2, said housing or frame will follow the terrain engaged by said traction wheels and the steering wheels also engaged with the terrain will cause the steering wheel housing 73 to rock about the axis of the shaft 70 to provide the articulated movement necessary for the four wheels of the vehicle to remain in constant contact with the terrain. This articulated structure assures that both of the traction wheels will always be in driving engagement with the terrain and any variation in that engagement that may tend to rock the differential housing is resisted by the frictional engagement of the friction plates 54 and 55 with the forward end of the torque arm 44. When it is desired to reverse the direction of movement of the vehicle, the shift lever 50 is moved to swing the torque arm 44 upwardly to rock the differential housing moving the differential drive shaft 38 toward the power shaft 21, loosening the belt 40, whereby the pulley 28 may turn freely therein and effecting engagement of the periphery of the reverse wheel 41 with the friction drum 29 to rotate the differential drive shaft 38 and through the differential mechanism rotate the differential driven shafts 30 and 31 to turn the traction wheels 3 and move the vehicle in a reverse direction.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A power driven vehicle comprising, a wheel supported frame structure having a power unit thereon, a differential housing having oppositely extending driven shafts with traction wheels secured to said shafts, means adjacent one end of the frame structure rotatably supporting the differential housing for rocking movement on the axis of said driven shafts, a differential drive shaft extending towards the power unit and in a plane transversely of and perpendicular to the axis of the differential driven shafts, a power shaft connected with the power unit and extending toward the differential housing with the axis of said power shaft in a plane transversely of and perpendicular to the axis of the differential driven shafts, a pulley and a friction drum fixed on the power shaft and adapted to be constantly rotated by the power unit, means leading from said constantly rotated pulley to selectively rotate the differential drive shaft in one direction, a friction plate fixed on the differential drive shaft and adapted to be brought into frictional engagement with the friction drum to reverse the direction of the differential drive shaft, an arm fixed relative the differential housing and extending therefrom substantially radially of the axis of the differential driven shafts, and means on the frame and operatively connected with said arm for rocking the differential housing through a suitable arc to maintain drive connection between the pulley on the power shaft and the differential drive shaft and for disengaging said drive connection and move the periphery of the friction plate into frictional engagement with the friction drum.

2. A power driven vehicle comprising, a wheel supported frame structure having a power unit thereon, a differential housing having oppositely extending driven shafts with traction wheels secured to said shafts, means adjacent one end of the frame structure rotatably supporting the differential housing for rocking movement on the axis of said driven shafts, a differential drive shaft extending towards the power unit and in a plane transversely of and perpendicular to the axis of the differential driven shafts, a power shaft connected with the power unit and extending toward the differential housing with the axis of said power shaft in a plane transversely of and perpendicular to the axis of the differential driven shafts, a pulley and a friction drum fixed on the power shaft and adapted to be constantly rotated by the power unit, means leading from said constantly rotated pulley to selectively rotate the differential drive shaft in one direction, a friction plate fixed on the differential drive shaft and adapted to be brought into frictional engagement with the friction drum to reverse the direction of the differential drive shaft, an arm fixed relative to the differential housing and extending therefrom substantially radially of the axis of the differential drive shafts for rocking said differential housing through a suitable arc to maintain drive connection between the pulley on the power shaft and the differential drive shaft and for disengaging said drive connection and moving the periphery of the friction plate into frictional engagement with the friction drum, and friction means fixed relative to the frame structure and having sliding engagement with said arm for resisting rotation of the differential housing relative the frame structure.

3. A power driven vehicle comprising, a wheel supported frame structure having a power unit thereon, a differential housing having oppositely extending driven shafts with traction wheels secured to said shafts, means adjacent one end of the frame structure rotatably supporting the differential housing for rocking movement on the axis of said driven shafts, a differential drive shaft extending towards the power unit and in a plane transversely of and perpendicular to the axis of the differential driven shafts, a power shaft connected with the power unit and extending toward the differential housing with the axis of said power shaft in a plane transversely of and perpendicular to the axis of the differential driven shafts, said differential drive shaft having a free end extending beyond the free end of the power shaft, a pulley and a friction drum fixed on the power shaft and adapted to be constantly rotated by the power unit, means leading from said constantly rotated pulley to selectively rotate the differential drive shaft in one direction, a friction plate fixed on the differential drive shaft and adapted to be brought into frictional engagement with the friction drum to reverse the direction of the differential drive shaft, an arm fixed relative to the differential housing and extending therefrom substantially radially of the axis of the differential driven shafts for rocking the differential housing through a suitable arc to maintain drive connection between the pulley on the power shaft and the differential drive shaft and for disengaging said drive connection and moving the periphery of the friction plate into frictional engagement with the friction drum, said arm having substantially flat paralel faces on opposite sides thereof adjacent the free end thereof, spaced friction plates on opposite sides of the arm adapted to engage the flat faces thereof, one of said friction plates being fixed relative to the frame structure, means supporting the other friction plate for movement toward and away from the fixed friction plate, and resilient means urging said other friction plate toward the fixed friction plate to frictionally clamp the arm therebetween for resisting rotation of the differential housing relative the frame structure.

4. A power driven lawn mower comprising, a frame structure having a power unit thereon, a differential housing, means at one end of the frame structure rotatably supporting the differential housing for rocking movement about an axis transversely of said frame structure, driven shafts extending oppositely from the differential housing coaxial of the axis of rotation of the differential housing, traction wheels fixed to said driven shafts, a differential drive shaft extending toward the power unit and in a plane transversely of and perpendicular to the axis of the differential driven shafts, a power shaft connected with the power unit and extending toward the differential housing with the axis of said power shaft in a plane transversely of and perpendicular to the axis of the differential driven shafts and spaced from the differential drive shaft with the end of said power shaft extending beyond the end of the differential drive shaft, a pulley and a friction drum fixed on the power shaft and adapted to be constantly rotated by the power unit, a second pulley fixed on the differential drive shaft, flexible means operatively connecting the pulley on the power shaft with the pulley on the differential drive shaft to rotate same, a friction plate fixed on the differential drive shaft and adapted to be brought into frictional engagement with the friction drum to reverse the direction of rotation of the differential drive shaft, a torque arm fixed to the differential housing, a lever pivoted on the frame adjacent the torque arm, a link operatively connecting the lever with the torque arm for moving same to rock the differential housing through a suitable arc to maintain tension on the flexible member between the power shaft pulley and the differential drive shaft pulley and for disengaging said flexible driving member and for moving the periphery of the friction plate into frictional engagement with the friction drum, a plate fixed on the frame structure and engaging the torque arm through its arc of movement, and means supported on the plate for resiliently urging the torque arm into engagement with said plate to form a frictional contact to dampen vibration and resist rotation of the differential housing relative to the frame structure.

References Cited in the file of this patent

UNITED STATES PATENTS

| | | |
|---|---|---|
| 968,521 | Baird | Aug. 30, 1910 |
| 1,431,020 | Michaud | Oct. 3, 1922 |
| 1,522,687 | Lust | Jan. 13, 1925 |
| 2,457,821 | Johnson | Jan. 4, 1949 |
| 2,712,857 | Jackson | July 12, 1955 |